United States Patent
Khanamirian

(10) Patent No.: US 6,235,661 B1
(45) Date of Patent: *May 22, 2001

(54) FABRIC LAMINATED FLOTATION FOAM MATERIAL FOR MANUFACTURING LIFE JACKETS AND SIMILAR ARTICLES AND ARTICLES MANUFACTURED USING SUCH MATERIALS

(75) Inventor: Alexander Khanamirian, Miami Beach, FL (US)

(73) Assignee: Extrasport, Inc., Miami, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/880,867

(22) Filed: Jun. 23, 1997

(51) Int. Cl.⁷ .............................. B32B 5/22; B63C 9/115
(52) U.S. Cl. ................... 442/223; 428/218; 428/316.6; 441/112; 441/113; 442/224; 442/315; 442/372; 442/373
(58) Field of Search .................................. 442/183, 221, 442/223, 224, 315, 372, 373; 441/106, 108, 112, 113; 428/218

(56) References Cited

U.S. PATENT DOCUMENTS

| | | | |
|---|---|---|---|
| 3,939,511 | * | 2/1976 | Buttenschon . |
| 4,668,202 | * | 5/1987 | Scheurer . |
| 4,692,199 | * | 9/1987 | Kozlowski . |
| 5,030,153 | * | 7/1991 | Bailey . |
| 5,254,197 | * | 10/1993 | Klems . |
| 5,452,477 | * | 9/1995 | Mann . |
| 5,660,572 | * | 8/1997 | Buck . |

OTHER PUBLICATIONS

2000 Gregory Mountain Products, Denali Pro Professional Series, 1 page, (Month Unknown).

"Camp Trails, a Lifetime of Good Times," 1998 Backpacks and Tents, Johnson Worldwide Associates, 4 total pages (front cover, back cover, pp. 26–27). (Month Unknown).

* cited by examiner

Primary Examiner—Blaine Copenheaver
(74) Attorney, Agent, or Firm—Foley & Lardner

(57) ABSTRACT

Heat, pressure, and glue are used to form a composite material in which a layer of U.S. Coast Guard approved flotation foam is located between a pair of fabric layers which are glued to the foam layer. The process of bonding the fabric layers to the foam layer is accomplished using both heat and pressure whereby a fabric covered, foam composite structure is provided. In a preferred embodiment, a flotation foam of the type which can be included in the calculation of flotation for a U.S. Coast Guard approved PFD is used, so the composite material can be used both as a fabric and as flotation in a U.S. Coast Guard approved PFD.

30 Claims, 7 Drawing Sheets

FABRIC LAMINATED FLOTATION FOAM MATERIAL FOR MANUFACTURING LIFE JACKETS AND SIMILAR ARTICLES AND ARTICLES MANUFACTURED USING SUCH MATERIALS

FIELD OF THE INVENTION

The present invention relates to a laminated buoyant foam material for use in life jackets and similar articles. In particular, the invention relates to a laminated buoyant foam material which may be used as an approved flotation material in U.S. Coast Guard approved life jackets (and/or life vests, Personal Flotation Devices, Buoyancy Aides) not requiring an additional fabric covering or envelope, to articles made using the new material, i.e., to U.S. Coast Guard approved life jackets, and to a new method for manufacturing life jackets and other articles which are typically worn for protection.

BACKGROUND OF THE INVENTION

Personal flotation devices, or "PFDs", have evolved over the years from the old "Mae West", or kapok, type of life vests; then to vinyl covered foam rubber life jackets; and, finally, to more specialized flotation devices which are used when one engages in different types of water sports and boating activities. The U.S. Coast Guard has instituted regulations regarding the minimum flotation required of PFDs. As set forth in those regulations, the minimum flotation required depends upon the expected use of the PFD. The U.S. Coast Guard Regulations, Title 33 of the Code of Federal Regulations ("CFR"), Chapter 1, Part 175, Subpart B, require that recreational boats have at least one Coast Guard approved PFD on board for each person on a boat.

In recent years, safety concerns have caused the U.S. Coast Guard to modify the Regulations regarding minimum flotation for PFDs. Accordingly, PFDs are now segregated into different classes which depend upon the type of boating activity in which the PFD is intended to be used. Generally, there are five classes of PFDs as stipulated within the U.S. Coast Guard Regulations. They are designated as Type 1, offshore life jacket; Type 2, near shore buoyant vest; Type 3, flotation aid; Type 4, throwable device; and Type 5, special use device. The Type 3 PFDs, or flotation aids, are generally the best suited for most recreational water sports in which a significant degree of mobility, and arm and shoulder movement, are involved. Accordingly, they tend to be the most common type of PFDs in use. The U.S. Coast Guard Regulations require that all Type 3 PFDs have a minimum of 15.5 pounds of flotation when they are manufactured. As most adults generally weigh between 10 and 12 pounds when submerged in water, i.e., significantly less than the minimum Coast Guard flotation requirement, the provision of at least 15.5 pounds of buoyancy is sufficient to help insure that a person wearing such a PFD, properly fitted, will be able to float.

In the past, increasing the buoyancy of PFDs has generally required that there be an associated increase in the bulk of the PFD, as additional buoyant material is required to increase a PFD's buoyancy. The addition of thicker and/or additional buoyant material to a PFD typically results in increased bulk which tends to inhibit or restrict the freedom of movement of the wearer. This restriction on the freedom of movement of the wearer is especially a problem for PFD wearers who are involved in strenuous water sport activities which require a significant amount of movement of their arms, shoulders, and torso. By way of example, in canoeing, kayaking, rafting, wind surfing, or similar activities, significant arm, shoulder, and upper torso movement is required when the wearer is paddling or maneuvering sails and lines. In addition, most conventional PFDs do not tend to move with the wearer. Instead, they tend to ride up, or shift, on the wearer's torso, thereby making the PFD uncomfortable to wear and also interfering with the wearer's mobility.

As PFDs are more likely to be worn if they are comfortable, and as the mortality rate, due to drowning, would be lower if PFDs were always worn, the provision of a comfortable PFD would assist in decreasing the mortality rate due to drowning. Accordingly, it can be seen that a need has existed for a PFD which flexes with, and conforms more naturally to, arm, shoulder, and torso movement of a wearer, so that as the wearer moves, the PFD moves with the wearer. A PFD which moves with the wearer, rather than shifting, is far less likely to become uncomfortable for the wearer or to interfere with, or restrict, the movements of the wearer. At the same time, it would be desirable for such a PFD to provide enhanced flotation, so that it continues to meet or exceed U.S. Coast Guard Regulations for PFDs. Additionally, the greater comfort afforded by such designs would allow locating fabric laminated flotation sections so as to provide greater protection from impacts of various kinds, both when the wearer is "on board", and in the event of an unplanned swim (as frequently experienced by rafters and kayakers, etc. in rocky rivers.

PFDs are generally constructed of a fabric material which encloses a foam material which is used for flotation. Typically, the fabric material is sewn around the foam material thereby enclosing and protecting the flotation foam in a fabric "pocket". As is well known in the art, the present design of PFDs includes a number of sewn pockets, each of which typically retains a piece of flotation foam. The size and shape of the pockets, and the size and shape of the enclosed foam, must, of course correspond to one another.

As the foam which is typically used in a PFD is firmer than the surrounding fabric material, bending of the PFD can be enhanced by providing a seam between adjacent foam-holding pockets. This is commonly referred to as a "quilting seam". As is well known to those skilled in the art, present and past PFDs of this type exhibit substantial amounts of sewing, and numerous seams, in order to provide its desired shape, while enclosing a sufficient quantity of flotation foam to provide at least the minimum flotation required by the U.S. Coast Guard regulations for the type of PFD being manufactured. In addition, the sewn seams allow for increased bending of the PFD where desired. Even a relatively simple PFD design will generally include at least two side panels, a back panel, and, typically, at least two front panels (which are usually joined together by some sort of closure system, such as straps or a zipper, when the PFD is worn). Thus, even a simple design for a PFD may include five pockets, each of which encloses a piece of flotation foam which has been cut to the desired shape prior to being inserted into the pocket which is formed in the fabric material to receive the flotation foam.

If more complicated designs are desired, for example, to provide for more conformal bending of the PFD, then it is necessary to include additional seams where such additional bending is desired, as the seams act as the "hinges" between adjacent panels. As quilting seams are added, there is the obvious loss of space within the empty fabric envelope, which translates into less space available for the flotation material itself, and, therefore, reduced flotation and buoyancy of the PFD. Of course, using current manufacturing techniques and materials, this means that there must be additional pieces of foam, and/or pieces of additional thickness, as well as additional sewn seams, all adding to the complexity of the design, the number of seams required, and the labor and material costs associated with manufacturing the PFD.

While those skilled in the art will recognize that "belts", vests, rafts, and some other flotation articles have been made for some time by dipping a flexible flotation foam into a liquid vinyl, so that the vinyl forms a skin over the foam, the use of such technology has generally been limited to providing flotation devices (belts and vests) for use by water skiers. Typically, devices manufactured using the vinyl dipping technology of the prior art are notoriously hot, and they stick to the skin. Further, they typically tend to crack around the edges, so they were not only uncomfortable, but they cause abrasion, particularly around the armholes and sides.

Adding to the foregoing problem is that the U.S. Coast Guard Regulations require that the flotation in a PFD be provided by an approved material, and the only presently approved flotation materials are flotation foams. The U.S. Coast Guard has approved the use of Neoprene as a fabric in manufacturing PFDs. Neoprene is a soft, elastic, stretchable, flexible polychloroprene foam material, which can be laminated to a segmented polyurethane known as LYCRA (a synthetic fiber produced by E. I. DuPont de Nemours and Company, located in Wilmington, Del.). While Neoprene, laminated with Lycra, is an approved fabric, neither Neoprene nor Neoprene laminated with LYCRA can be used alone to replace flotation foam. Instead, the laminate is used to enclose an approved foam in a PFD. Other stretch fabrics, such as a spandex omni-directional wrap knit laminated to a monolithic film which is known as DARLEXX (an elastic fabric produced by Darlington Fabrics Corporation, New York, N.Y.), are not approved for use to enclose approved flotation foams in PFDs.

In view of the above, it would be desirable to be able to manufacture PFDs using a U.S. Coast Guard approved flotation material which did not rely upon the enclosure of a flotation foam by an approved fabric material where the fabric material has been stitched to hold individual pieces of foam and which could be molded to various body conforming shapes which enhance comfort, flexibility, mobility, appearance, and/or provide additional body protection from impact. Also, it would be desirable to be able to form such articles in desired shapes and configurations while still providing them with a fabric exterior, rather than with a vinyl exterior or a hardened foam exterior.

SUMMARY OF THE INVENTION

Recent advances in the fabrication of flotation foam and stretch fabrics, coupled with the use of advanced bonding materials and thermopressure processes, have enabled the creation of bonded, laminate materials in which a fabric and a foam can be bonded together. The present invention exploits, and advances such technology to provide a material in which a U.S. Coast Guard approved fabric is bonded to a U.S. Coast Guard approved flotation foam to produce a material which can act as both the fabric and as the flotation in a U.S. Coast Guard approved PFD. The result is a bonded material which is able to be formed, or, alternatively, both formed and embossed using a thermopressure process to create PFDs and other related sports products. Using the combination of the process, the components and the superior PFD design, the result is an ergonomically contoured design which provides the wearer superior fit, form, function, protection and is aesthetically pleasing.

In accordance with the present invention a laminated material has been developed in which a strong, stretchable material, such as stretch-Cordura (a DuPont product) is bonded to a U.S. Coast Guard approved flotation foam using glue and heat in a thermal bonding process. It has been found that in the course of performing the thermal bonding of the stretchable material to the flotation foam to bond the two together, the laminated product can be embossed whereby "pockets" can be formed in arbitrary numbers and shapes. While the pockets are not needed to hold individual pieces of flotation foam as they were in the PFD materials of the prior art, the seams between the pockets have been found to be capable of acting as extremely flexible hinges, despite the fact that they have highly compressed foam material in the laminate formed in accordance with the present invention. Accordingly, unlike the prior art materials in which the foam acted solely as a flotation material and in which the fabric acted to hold the flotation foam in place and to provide hinges between adjacent panels, the fabric-foam laminate of the present invention has flotation foam inside of each of the hinges (which was not present in the prior art).

In addition to being able to create arbitrary "seams" wherever desired, thereby providing for easy bending of the material at the locations of such "seams", it is also possible to modify the thickness of the material during the bonding/embossing process. Consequently, it becomes feasible to design contoured pads, in such shapes and sizes as desired, and the contoured shapes which are created in accordance with the invention are smoothly contoured. This capability was not previously present in the fabric pocketed designs of the prior art to the extent or degree now possible for all of the stated reasons and, implicitly, the inability to insert foam pieces within the shapes able to be contoured through the molding and bonding process. While heretofore the contour of flotation foam has essentially been effected using cutting knives of various sorts to create only two dimensional cuts prior to enclosing it inside of a sewn pocket, the fabric material of the pocket could not conform to the shape of the foam flotation material unless the foam flotation material had a generally convex shape. If the foam flotation material had a concave shape, then the outer fabric would hang away from the foam, thereby detracting from the appearance of the article.

In accordance with another aspect of the present invention, PFDs can now be manufactured out of foam laminate material in accordance with the present invention to obtain PFDs having highly bendable "seams" and having unique three dimensional appearances, not previously possible to manufacture.

DETAILED DESCRIPTION OF AN EXEMPLARY EMBODIMENT

Figure 1:
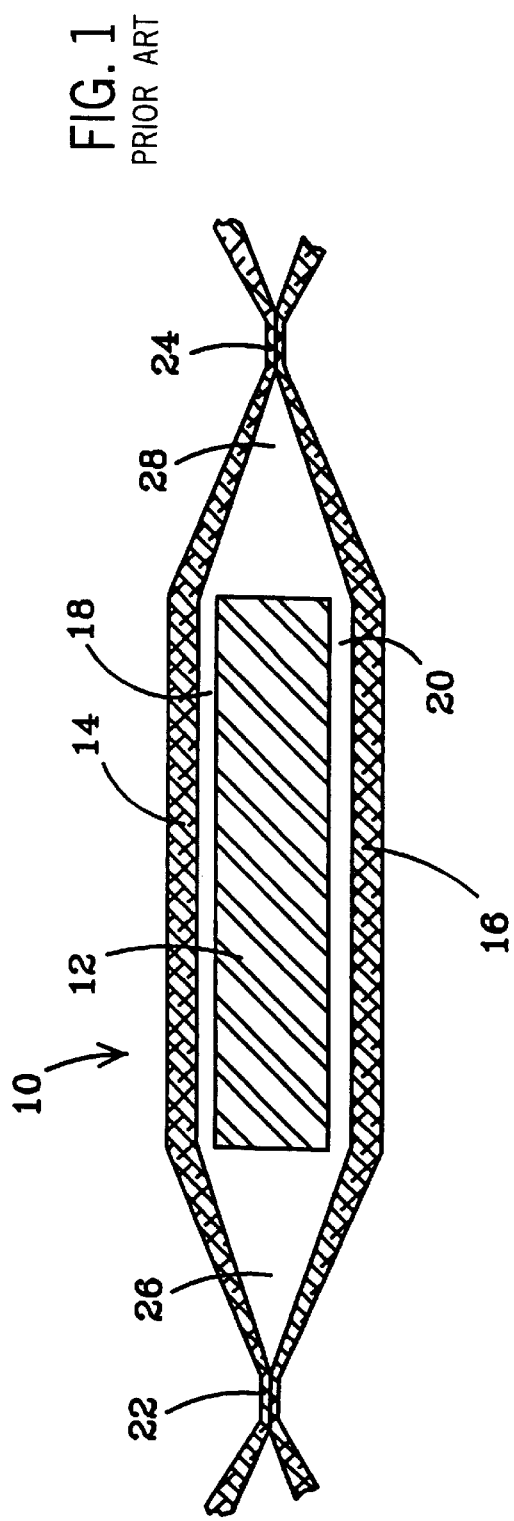
FIG. 1 is a cross-sectional view illustrating the fabric and foam materials used in the prior art.

Referring now to FIG. 1, a cross-sectional view of the fabric and foam material 10 used in the prior art is shown. As illustrated, in the construction heretofore used, a piece of flotation foam 12 was surrounded by pieces of fabric 14, 16, typically an oxford or twill nylon, or a polyester material, with air spaces 18, 20, 26, 28 therebetween. Seams 22, 24 are sewn around the flotation foam 12 thereby forming a pocket which retains the flotation foam 12. As shown in FIG. 1, while the prior art system for retaining flotation foam 12 within seamed pieces of fabric 14, 16 works quite well, the flotation foam 12 is not fixed to the fabric 14, 16. This means that the flotation foam 12 can move somewhat within the pocket, if the flotation foam 12 is somewhat undersized, or alternatively, if the flotation foam 12 is oversized somewhat, or if the seams 22, 24 are sewn too close to the flotation foam 12, then the fabric 14, 16 will distort the shape of the flotation foam. Note, also, that if any form of taper is required, then the taper must be accomplished by shaping the flotation foam 12, i.e., by cutting the flotation foam 12 as desired prior to insertion into a partially formed pocket. Obviously, this represents a costly, time consuming operation, and it can result in wasted flotation foam 12. In addition, it allows for much greater possibility for quality control errors in the size and thickness of the pieces of flotation foam. Those skilled in the art will recognize, also, that while it is possible to form convex shapes, i.e., shapes which "bulge" outward, as illustrated in FIG. 1, the prior art method and materials are not conducive to the manufacture of concave shapes, and concave shapes can be useful for both protective reasons and decorative reasons. Finally, in a standard manufacturing operation, it may be necessary to cut many different sizes and shapes of flotation foam 12 in order to make a life jacket which is of even a relatively simple design. For these and other reasons, the present invention provides significant benefits over the manufacturing procedures used in the prior art.

Figure 2:
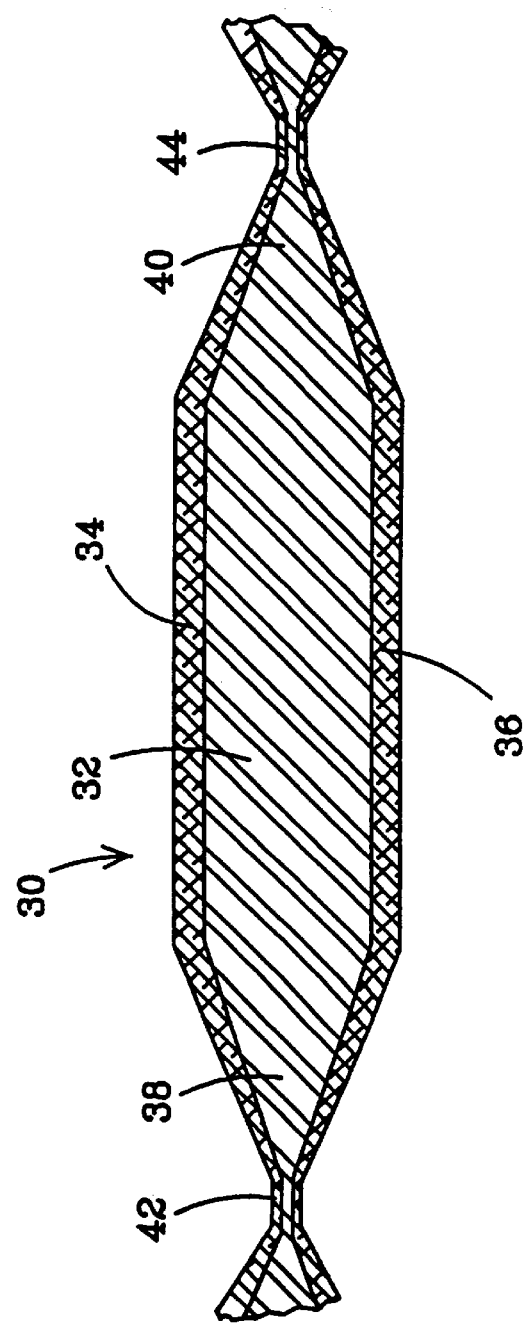
FIG. 2 is a cross-sectional view illustrating one of many possible configurations of the laminate material of the present invention.

Given the problems which have heretofore existed with the manufacturing materials and procedures heretofore used, the present invention provides numerous benefits. Referring now to FIG. 2, a cross-sectional view of a fabric laminate structure 30 made in accordance with the present invention is illustrated. As illustrated, in the construction of the present invention a piece of flotation foam 32 is surrounded by pieces of fabric 34, 36, such as an air-textured, high tenacity nylon known as stretch CORDURA. Preferably, glue is placed between the flotation foam 32 and the fabric pieces 34, 36, and then heat and pressure are applied to the layered composite using a mold formed much like a waffle iron in order to bond the fabric 34, 36 to the flotation foam 32 and to shape the flotation foam 32 which is a thermoplastic material, as shown at the ends 38, 40. Unlike the structure 10, shown in FIG. 1, there are no significant air spaces between the flotation foam 32 and the fabric 34, 36, as the fabric pieces 34, 36 are bonded to the flotation foam 32. Also, it is not necessary to sew seams, like the seams 22, 24 shown in FIG. 1, although stitching can be used, if desired. Instead of sewn seams, the heat and pressure which are applied to the fabric 34, 36 and flotation foam 32 form molded seams 42, 44 which can be either decorative or functional, i.e., they can act as hinges between adjacent foam holding pockets, as was done in the prior art.

As will be recognized by those skilled in the art, the construction of the present invention has numerous benefits over the construction methods formerly used. In particular, there is no limit to the number of pockets, or seams which can be included within a design, as the shape is determined in a molding (or embossing) process, rather than in a labor intensive sewing process. This means that once a mold has been made, complicated patterns are replicated as quickly as simple patterns, and no additional labor is required. Also, it is not necessary to do nearly as much cutting and storing of foam pieces, as they are shaped in the molding process, rather than in a labor intensive cutting process. Additionally, in the locations where the hinges are created, the flotation material is actually permanently compressed to a thin layer not at all feasible with thick sections of flotation material using sewing techniques and non stretch materials. In accordance with the preferred embodiment of the invention, the flotation foam is preferably compressed to approximately ⅛ inch in thickness in those portions which act as hinges. Those skilled in the art will recognize that there may be designs, or portions of designs, where the compression at the "hinge" area yields a thickness greater than ⅛ inch, however, and this thickness can vary, also, with the softness of the foam being molded as softer foams are more difficult to get down to the ⅛ inch thickness. Further, as will be illustrated hereinafter, as the fabric pieces 34, 36 are bonded to the flotation foam 32, it is now possible to create convex shapes, as in the prior art, or concave shapes which were not heretofore possible, and all shapes provide a much smoother and more "finished" look than was possible using the "foam in pocket" construction of the prior art As shown in FIG. 1, while the prior art system for retaining flotation foam 12 within seamed pieces of fabric 14, 16 works quite well, the flotation foam 12 is not fixed to the fabric 14, 16. This means that the flotation foam 12 can move somewhat within the pocket, if it is somewhat undersized, or alternatively, if the flotation foam 12 is oversized somewhat, or if the seams 22, 24 are sewed too close to the flotation foam 12, then the fabric 14, 16 will distort the shape of the flotation foam. Note, also, that if any form of taper is required, then the taper must be accomplished by shaping the flotation foam 12, as shown on the ends 26, 28 of the flotation foam 12, by cutting the flotation foam 12, as desired prior to insertion into a partially formed pocket. Obviously, this represents a costly, time consuming operation, and it can result in wasted flotation foam 12. Those skilled in the art will recognize, also, that while it is possible to form convex shapes, i.e., shapes which "bulge" outward, as illustrated in FIG. 1, the prior art method and materials are not conducive to the manufacture of concave shapes, and concave shapes can be useful for both protective reasons and decorative reasons. Finally, in a standard manufacturing operation, it may be necessary to cut many different sizes and shapes of flotation foam 12 in order to make a life jacket which is of even a relatively simple design. Also, if convex or concave shapes were utilized using conventional methods, the fabric pocket necessarily being of a size significantly larger than the foam insert, there would be significant chance and likelihood that the flotation material could shift or turn, thereby not only mitigating the value of using the shape, but possibly altering the flotation performance of the overall device when needed. For example, two pieces placed in the same pocket, one toward the upper portion of the device, the other below it, could shift so that both pieces go to the bottom of the device. This would necessarily change the performance of the PFD on an individual in the water, and perhaps defeat a portion of the intent of its use. For these and other reasons, the present invention provides significant benefits over the manufacturing procedures used in the prior art.

Figure 3:
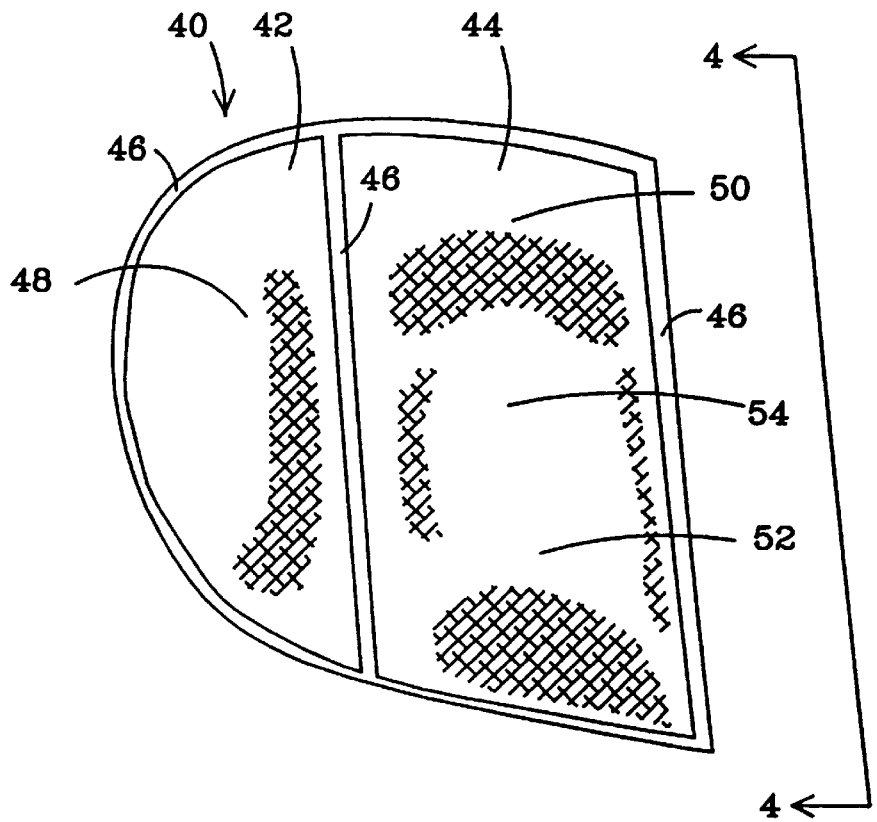
FIG. 3 is a top plan view illustrating a first embodiment of an article manufactured using the laminate of FIG. 2.
Figure 4:
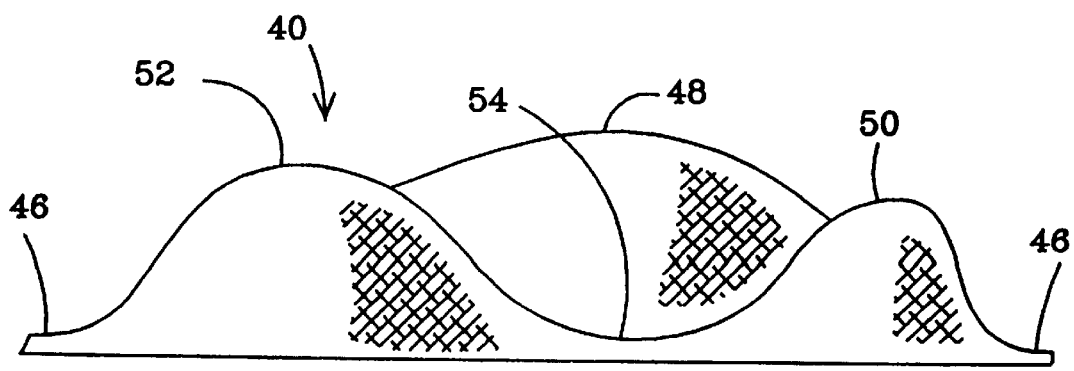
FIG. 4 is a side view of the article of FIG. 3 taken along the line 4—4 of FIG. 3.

Referring now to FIGS. 3 and 4, additional benefits of the present invention are illustrated. In FIG. 3, a top view of a portion of an article 40 (which could be a portion of a PFD, or a protective pad of the type which might be used in other sports, such as roller blading, constructed using the present invention is shown. As illustrated in FIG. 3, the article 40 has been embossed to include two sections 42, 44 which are formed when "seams" 46 are formed during the bonding-embossing process used to bond the fabric to the foam. At the same time, the contours of the article 40 are formed such that there is a high portion 48 in section 42 and both high portions 50, 52 and a low portion 54 in section 44. These high and low portions are illustrated in the side view shown in FIG. 4, and they illustrate that both convex (see portions 48, 50, 52) and concave portions (see portion 54), can be formed using the present invention.

Figure 5:
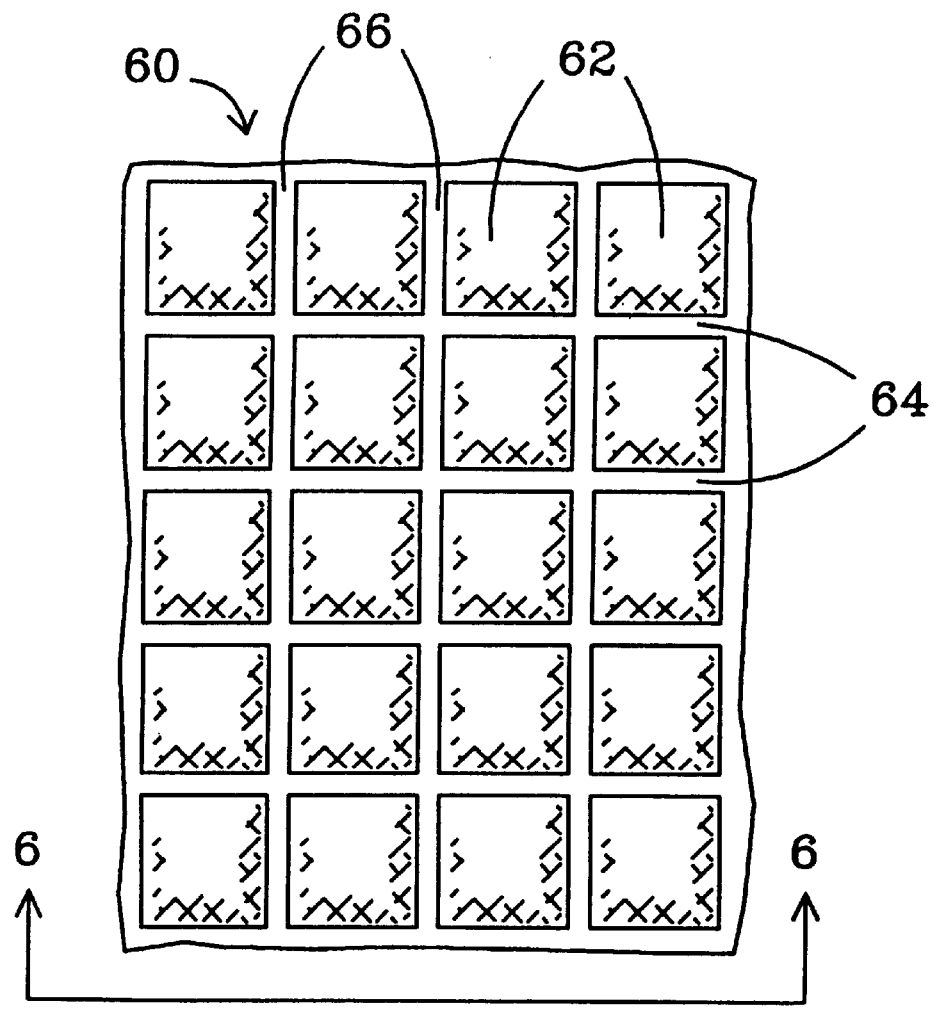
FIG. 5 is a top plan view of a second embodiment of an article manufactured using the laminate of FIG. 2.
Figure 6:
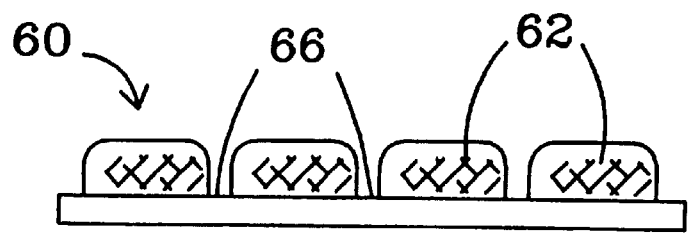
FIG. 6 is a side view of the article of FIG. 5 taken along the line 6—6 of FIG. 5.

Referring now to FIGS. 5 and 6, the way in which the composite material of the present invention can be used to create patterns is illustrated by a portion of an article 60. In FIG. 5, a top view of a portion of the article 60, which could be a portion of a PFD, or a protective pad of the type which might be used in other sports, such as roller blading, constructed using the present invention, is shown. As illustrated in FIG. 5, the article 60 has been embossed to include a pattern of rectangular sections 62 which are formed when horizontal and vertical (as viewed in FIG. 5) "seams" 64, 66, respectively, are formed during the bonding-embossing process used to bond the fabric to the foam. At the same time, the contours of the sections 62 are formed in the article 60 such that there are a higher portions in centers of the sections 62, as illustrated in FIG. 6. The "seams" 64, 66 correspond to low portions of the pattern, and they provide for both decorative and functional aspects in that they act as hinges, as described above. As will be obvious to those familiar with the art, to manufacture a life jacket having similar patterns to those illustrated in FIGS. 3–6 using the prior art methods and materials, which required individual foam cutting and individual pocket sewing, would have been prohibitively time consuming and expensive, particularly if the sections 62 were made to be quite small (i.e., using squares having side edges which are about one inch long).

As described above, the material of the present invention is functional, in that it may include the flotation foam required by U.S. Coast Guard regulations and it may be sewn together to make up all, or parts, of articles such as life jackets. In addition, the material of the present invention can be decorative, while still providing at least some (if not all) of the required flotation used in a U.S. Coast Guard approved PFD.

Figure 7:
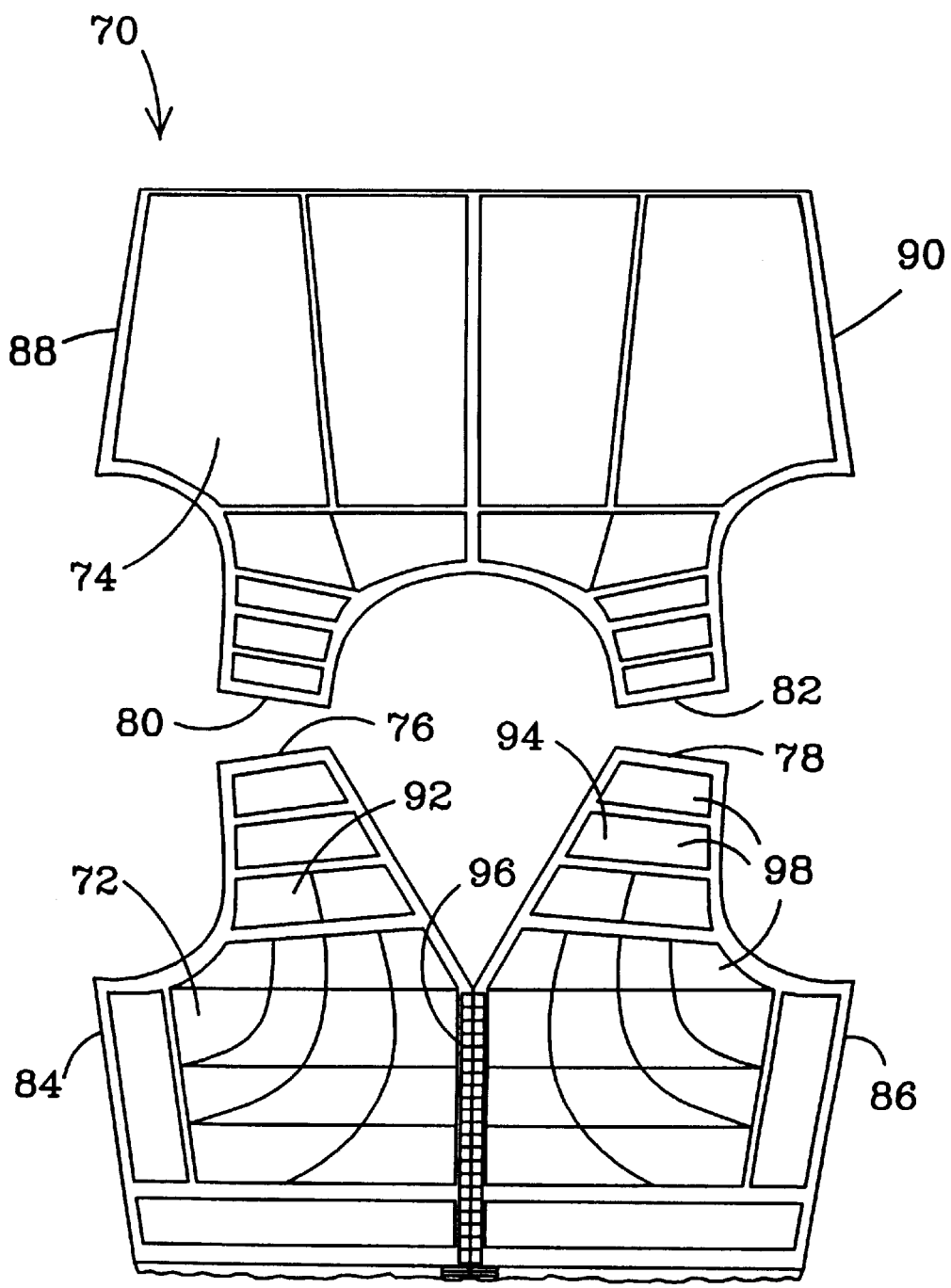
FIG. 7 is a plan view of a first PFD manufactured in accordance with the present invention.

Referring now to FIG. 7, the design of a first PFD 70 in accordance with the present invention is shown. As illustrated, the PFD design 70 includes both a front portion 72 and a rear portion 74 (shown upside down relative to the front portion 72, in order to illustrate how the tops 76, 78 of the front portion 72 align with the tops 80, 82 of the rear portion 74 so that they may be sewn together). In order to assemble the PFD 70, the sides 84, 86 of the front portion 72 are preferably sewn to the sides 88, 90 of the rear portion 74. In the PFD 70, the front portion 72 is made up of a pair of panels 92, 94 which are joined by a suitable closure system, such as the zipper 96 which is used in the preferred embodiment of the invention (but which those skilled in the art will recognize could be replaced by any other suitable closure system, such as belts, etc.). By using the constructive method of the present invention, wherein a fabric-foam laminate is heat molded in a thermopressure process, the flotation foam may be included in decoratively shaped portions 98, as shown.

While the use of a thermopressure process to manufacture the composite fabric/foam material used in the present invention has been generally described, and while those skilled in the art will recognize that the present invention is not intended to be limited to any specific thermopressure process, in the preferred embodiment of the invention the thermopressure process subjects the high performance materials, such as those described herein, to pressures of up to about 24,000 psi, and temperatures ranging from 150° F. to about 350° F. Also, the bonding agent which has been used as the "glue" between the foam and fabric layers in the preferred embodiment of the invention is called Industrial Adhesive 4550, which is a clear, synthetic elastomer based adhesive, having a hexane solvent, which is designed for bonding lightweight materials, and which has a viscosity of between about 1000 and 3500 cps and a flashpoint of about −10° F.)

Figure 8:
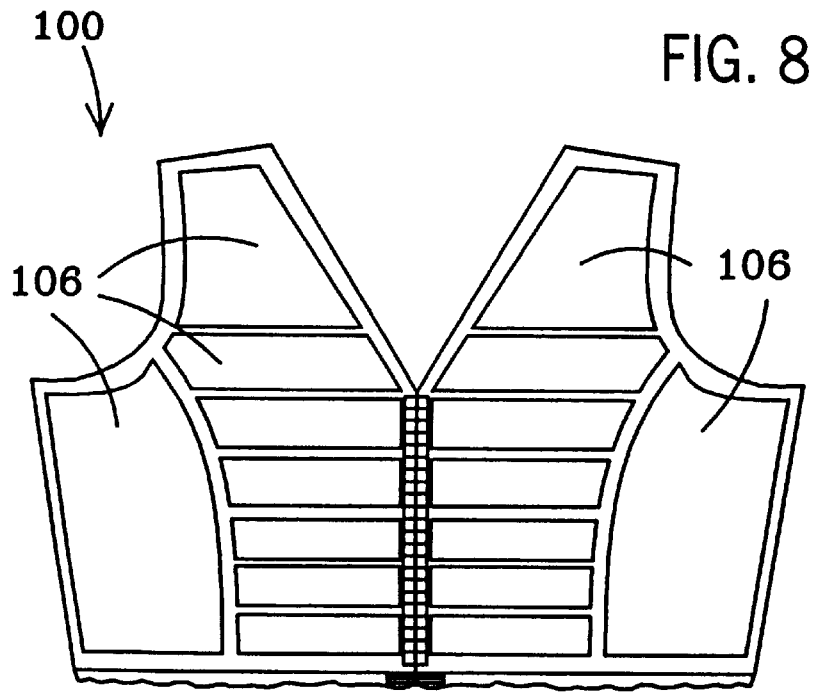
FIG. 8 is front view of a second PFD manufactured in accordance with the present invention.
Figure 9:
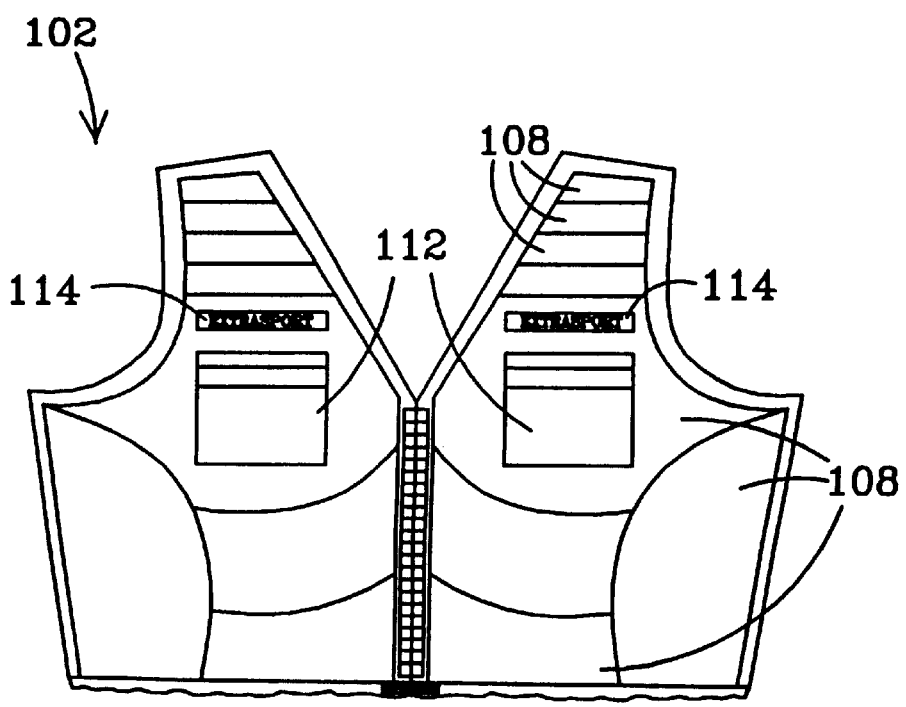
FIG. 9 is a front view of a third PFD manufactured in accordance with the present invention.
Figure 10:
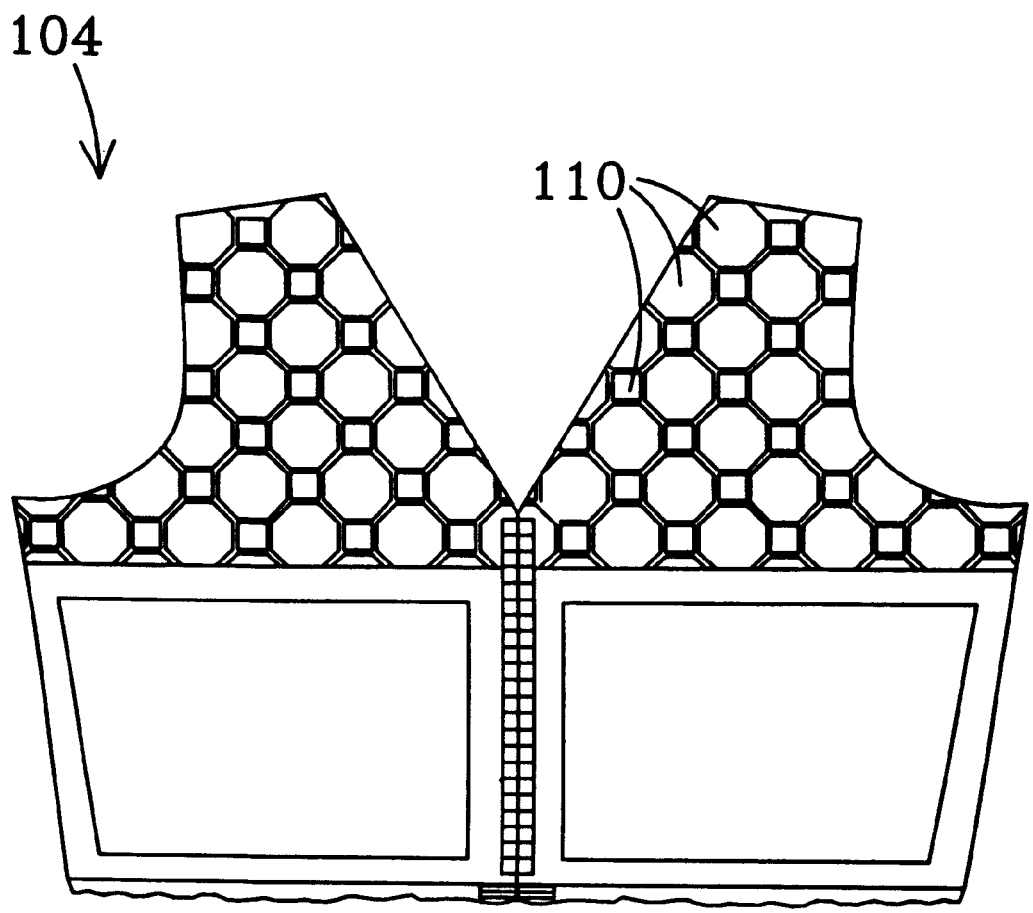
FIG. 10 is a front view of a fourth PFD manufactured in accordance with the present invention and FIG. 11 is a cross-sectional view of another embodiment of the laminate of the present invention.

Referring now to FIGS. 8–10, the fronts of additional PFDs 100, 102, 104 made in accordance with the present invention, are shown. These PFDs 100, 102, 104 include portions 106, 108, 110, respectively, which are both decorative and functional. As will be obvious to those skilled in the art, it is possible to incorporate the present inventive construction method to include pockets 112, logos 114 (See FIG. 9), as well as shaped portions which provide both decoration and flotation 110 (See FIG. 10). The present invention allows for the formation of portions 110, as illustrated on the PFD 104 of FIG. 10 in shapes and sizes which could not heretofore have been formed using the construction and materials of the prior art.

The present invention has been described with particular reference to a U.S. Coast Guard approved life jacket, as the only prior U.S. Coast Guard approved "fabric" which could be included as part of the required flotation needed to comply with U.S. Coast Guard Regulations for buoyancy in PFDs has been Neoprene. As is well known by those skilled in the art, Neoprene has not been used as the sole provider of flotation in U.S. Coast Guard approved PFDs because it gets extremely heavy when it is wet, and it cannot be sewn if it is too thick. Accordingly, Underwriters Laboratories, which performs the testing for U.S. Coast Guard approval for fabrics and flotation foams will only approve Neoprene having a thickness of up to 4.5 mm (0.18 inch), and it is believed that Neoprene is only manufactured to a thickness of ⅜ inch (9.53 mm). Similarly, there has not heretofore been any U.S. Coast Guard approved flotation foam which could also be used as an approved fabric for PFDs. Accordingly, the present invention, for the first time provides a combined fabric and flotation foam, which has been bonded to form a single, laminated material, which can be used either alone, or in conjunction with standard fabric and flotation foam to manufacture U.S. Coast Guard approved PFDs. Also, the bonded laminate material is believed to be the first combined fabric and flotation foam material which could be U.S. Coast Guard approved for use in a PFD, in which the thickness of the material is greater than ⅜ inch.

Notwithstanding the particular application for which the invention was initially directed, it will become obvious to those skilled in the art, that the unique combination of thermopressure contoured fabric and foam provided by the present invention can also be used to provide both decorative and protective wear for those engaged in sports other than water sports. By way of example, without intending to limit the generality of the foregoing, the thermopressure contoured and laminated material of the present invention could be used to manufacture such articles as protective pads for roller blading; protective padding for baseball umpires and/or catchers; and protective knee, shoulder, and elbow padding (or clothing articles including such padding) for a variety of sports. As will also be obvious to those skilled in the art, padding or decorative portions of such articles, made using the present inventive material could also be included as a portion of a garment which is not necessarily padded in other areas.

Further, it will be understood that protective items manufactured using the present invention can use foams having different softness ratings in a single design. Also, those skilled in the art will recognize that devices using the present invention to provide body protection can further include the inventive fabric/flotation foam laminate as the outer layer of their design. By locating such pieces so as to provide augmented protection from impact, and by layering the inner thickness of flotation foam a protective garment having a completely separate layer with a flotation foam of greater softness and a conforming fit of unprecedented degree can be provided. Accordingly, and by way of example, a softer foam can be used on the "inside" than on the outside to provide comfort to the wearer, while providing impact protection.

Figure 11:
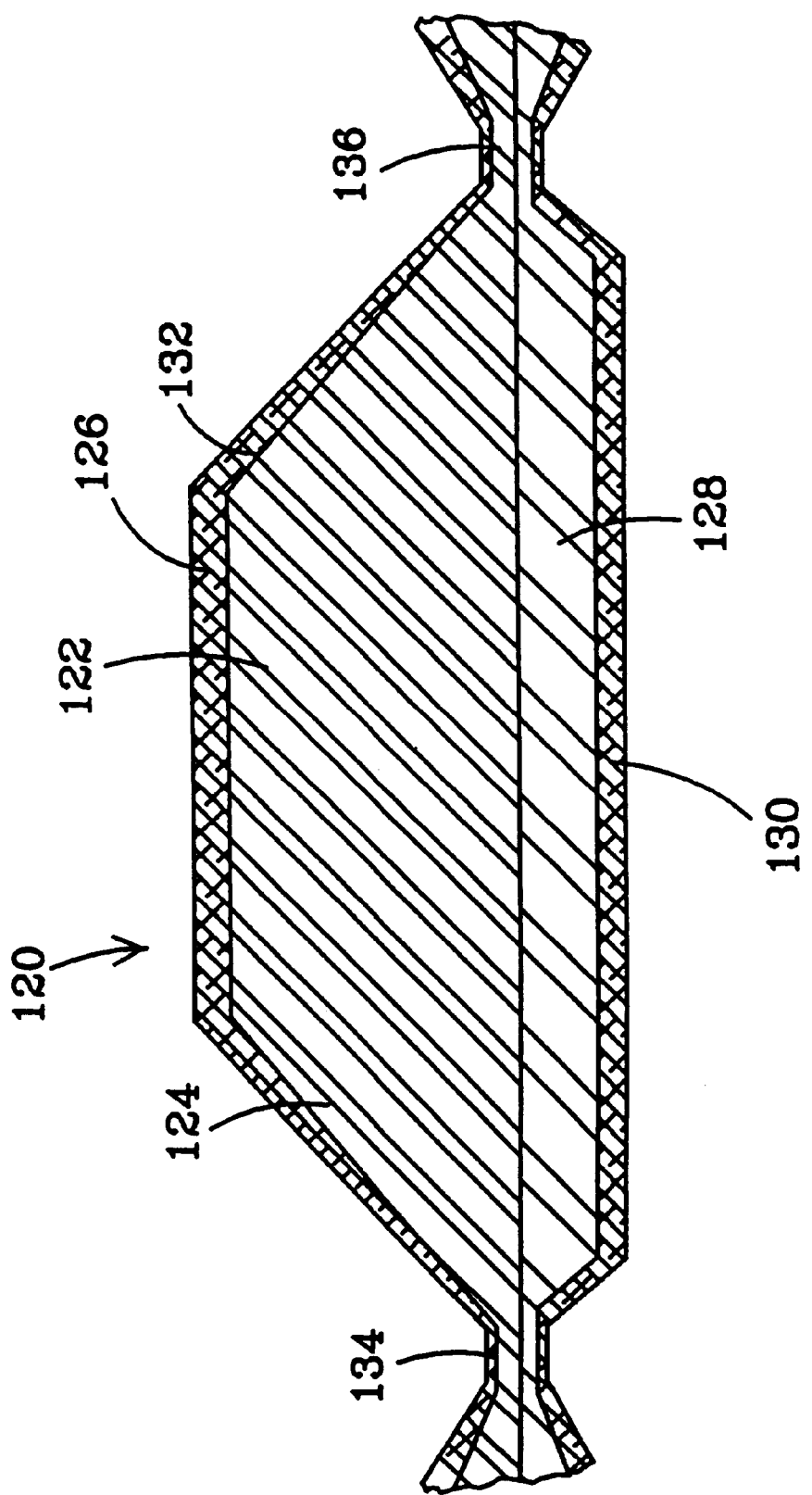

Referring, now to FIG. 11, a cross-sectional view of another embodiment 120 of the present invention is shown. In the embodiment 120, there are multiple layers. First, there is an upper layer 122, which is a composite of a flotation foam 124 and a bonded upper fabric layer 126. Next, there is a lower foam layer 128 and a lower fabric layer 130. The upper layer 122 is a bonded composite, in which the upper fabric layer 126 is thermally bonded to the upper flotation foam 124, as described above. In the thermal bonding process, a layer of glue is used at the interface 132 between the foam 124 and the fabric 126. In the embodiment illustrated in FIG. 11, the lower layer of foam 128 is preferably made of a soft foam material which is comfortable adjacent to the wearer. In addition, the lower foam layer 128 provides additional flotation material to meet buoyancy requirements. As illustrated, the lower fabric layer 130 is not bonded to the lower foam layer 128. Accordingly, the upper composite layer 122 (made of the upper foam layer 124 and the upper fabric layer 126) is sewn to the lower foam and fabric layers 128, 130 along seams 132, 134. Thus, the construction illustrated in FIG. 11 is somewhat similar to the construction of the prior art, except that no pockets are required in order to retain the flotation foam 124, 128. Further, unlike the construction of the prior art (See FIG. 1), the embodiment 120 provides a smoothly contoured outer finish which is capable of having concave surfaces, which is unlike the construction of the prior art. In addition, and also different from the prior art construction, the embodiment 120 provides for an easy way to produce a PFD which has foams having different degrees of firmness, in order to provide both impact protection and comfort, as desired, while still providing the decorative benefits available from the present invention.

Yet another advantage of the present invention is that the protective items formed using the invention have a smooth, contoured decorative appearance, not available from any of the prior art materials.

I claim:

1. A composite material including:
   at least one first layer of foam material, the at least one first layer of foam material having an upper surface and a lower surface;
   at least one first layer of fabric material which is bonded to said upper surface of said at least one first layer foam material, said composite material including embossing which compresses and permanently alters the cross-sectional shape of said at least one first layer of foam material, wherein said embossing includes hinge portions which are formed in the shape of lines at which the foam has been sufficiently compressed so as to function as a hinge along said lines, thereby facilitating the bending of said at least one first layer of foam material along said lines; and
   a second layer of foam material and a second layer of fabric material, said second layer of foam material having an upper surface and a lower surface, said upper surface of said second layer of foam material being adjacent to said lower surface of said at least one layer of foam material, said second layer of fabric material being adjacent to said lower surface of said second layer of foam material; said at least one first layer of foam material, said at least one first layer of fabric material, said second layer of foam material and said second layer of fabric material being joined together along seams sewn therethrough.

2. The composite material of claim 1 further comprising a glue layer formed between said at least one layer of foam material and said at least one layer of fabric material.

3. The composite material of claim 2 wherein said at least one first layer of foam material is a foam of the type which has U.S. Coast Guard approval for use as a flotation foam in PFDs.

4. The composite material of claim 1 wherein said at least one first layer of foam material has been compressed in said hinge portions so that it is approximately 1/8 inch thick in said hinge portions.

5. The composite material of claim 1 wherein said hinge portions are less than 1/8 inch thick.

6. The composite material of claim 1 wherein said at least one first layer of fabric material is an elastic, stretchable fabric.

7. The composite material of claim 6 wherein said at least one first layer of fabric material is a polychloroprene material.

8. The composite material of claim 1 wherein said at least one first layer of fabric material is selected from the group consisting of Neoprene fibers, segmented polyurethane fibers, spandex omni-directional wrap knit laminated to a monolithic film, and air textured high tenacity nylon fibers.

9. The composite material of claim 1, wherein the second layer of fabric material is bonded to said lower surface of said at least one first layer of foam material.

10. The composite material of claim 1 wherein at least one of said foam layers is a U.S. Coast Guard approved flotation foam.

11. The composite material of claim 1 wherein the density of said foam layers differs from one another.

12. A U.S. Coast Guard approved PFD manufactured using a composite material wherein said composite material includes a flotation foam layer having an upper side and a lower side, there being bonded to the upper side of said flotation material a layer of fabric material, whereby said composite material acts as both a fabric and as a flotation foam which can be included in the calculation of flotation in determining the flotation provided by said PFD;

wherein said composite material is formed in a process in which a glue layer is provided between said flotation foam layer and said layer of fabric material, and said composite is bonded in a process in which both heat and pressure are applied to said composite material to both bond said layers together and to emboss said composite material such that both the flotation foam and the layer of fabric material have raised and depressed portions;

a second layer of foam loosely held adjacent said lower side of said flotation foam; and a second layer of fabric material on the side of said second layer of foam remote from said composite material, said composite material and said second layer of fabric material being sewn together to capture the second layer of foam therebetween.

13. The U.S. Coast Guard approved PFD of claim 12, further comprising hinge areas formed between adjacent areas of said composite material, said hinge areas being formed by the application of sufficient heat and pressure during the process of manufacturing said composite material that said flotation foam is sufficiently compressed, whereby said areas act as hinges between areas adjacent to said hinge areas.

14. The U.S. Coast Guard approved PFD of claim 13 wherein said fabric is an elastic, stretchable fabric.

15. The U.S. Coast Guard approved PFD of claim 13 wherein said fabric is a polychloroprene material.

16. The U.S. Coast Guard approved PFD of claim 13 wherein said at least one first layer of fabric material is selected from the group consisting of Neoprene fibers, segmented polyurethane fibers, spandex omni-directional wrap knit laminated to a monolithic film, and air textured high tenacity nylon fibers.

17. The U.S. Coast Guard approved PFD of claim 13 wherein said flotation foam is selected from foams approved by the Coast Guard for use as flotation foams in PFDs.

18. The U.S. Coast Guard approved PFD of claim 12 wherein said composite material includes a fabric bonded to said lower side of said flotation material.

19. A personal flotation device comprising:

at least one panel configured to extend about a user's torso and over each of the user's shoulders, at least a portion of the at least one panel including:

a laminate having a first layer of flotation foam having an inner side adapted to face the user when the device is worn by the user and an opposite outer side; and a first layer of fabric bonded to the outer side of the layer of flotation foam, wherein selected portions of the layer of foam adjacent the outer side are compressed towards the inner side to form a raised portion and a depressed portion in the fabric adjacent to the outer side.

20. The device of claim 19 wherein the at least one panel pivots about the depressed portion.

21. The device of claim 19 wherein the raised portion and the depressed portion form a pattern.

22. The device of claim 19 wherein the at least one panel has opposite perimeter edges and wherein the depressed portion continuously extends between the opposite perimeter edges.

23. The device of claim 19 wherein the at least one panel includes:

a second layer of flotation foam having a first side and a second side, wherein the first side is loosely held adjacent the inner side of the first layer of flotation foam.

24. The device of claim 23 including a second layer of fabric adjacent the second side of the second layer of flotation foam.

25. The device of claim 23 wherein the first layer of flotation foam has a first density and wherein the second layer of flotation has a second density.

26. A method of manufacturing a U.S. Coast Guard approved PFD comprising the steps of:

(a) providing a layer of a U.S. Coast Guard approved flotation foam having an upper surface and a lower surface;

(b) applying at least one layer of thermally setting glue to said upper surface of said layer of flotation foam;

(c) applying a layer of a U.S. Coast Guard approved fabric to said at least one layer of glue;

(d) bonding said fabric layer to said upper surface of said layer of flotation foam by applying heat and pressure to the composite structure formed by said foam, glue, and fabric layers;

(e) providing a second layer of foam to the lower surface of said layer of flotation foam;

(f) providing a second layer of fabric to the lower surface of said second layer of foam; and (g) then sewing said second layer of fabric to the composite formed by said layer of flotation foam, said second layer of foam, and said second layer of fabric;

(h) forming a PFD out of the material formed in steps (a–d) by sewing together panels made of said material.

27. The method of claim 26 further wherein said step of bonding includes the step of using a mold to apply heat and pressure to said composite structure.

28. The method of claim 27 wherein said layer of flotation foam is made of a thermally plastic U.S. Coast Guard approved flotation foam, and said bonding step further comprises embossing said composite material by pressing said mold against the fabric to compress the fabric and the underlying floatation foam to form patterns in said material, whereby the glue simultaneously sets to bond the fabric to the foam while the foam is in a compressed state, whereby said patterns have raised and lowered portions.

29. The method of claim 26 wherein step (b) is comprised of providing layers of thermally setting glue to both said upper surface and said lower surface of said layer of flotation foam, step (c) is comprised of applying layers of U.S. Coast Guard approved fabric to each of said glue layers, and step (d) is comprised of bonding said fabric layers layer to said upper surface and to said lower surface of said layer of flotation foam by applying heat and pressure to the composite structure formed by said foam, glue, and fabric layers.

30. The method of claim 26 further comprising the steps of:

(a) providing a second layer of fabric to the lower surface of said layer of flotation foam; and (b) then sewing said second layer of fabric to the composite formed by said layer of flotation foam and said second layer of fabric.

* * * * *